Figure 1:
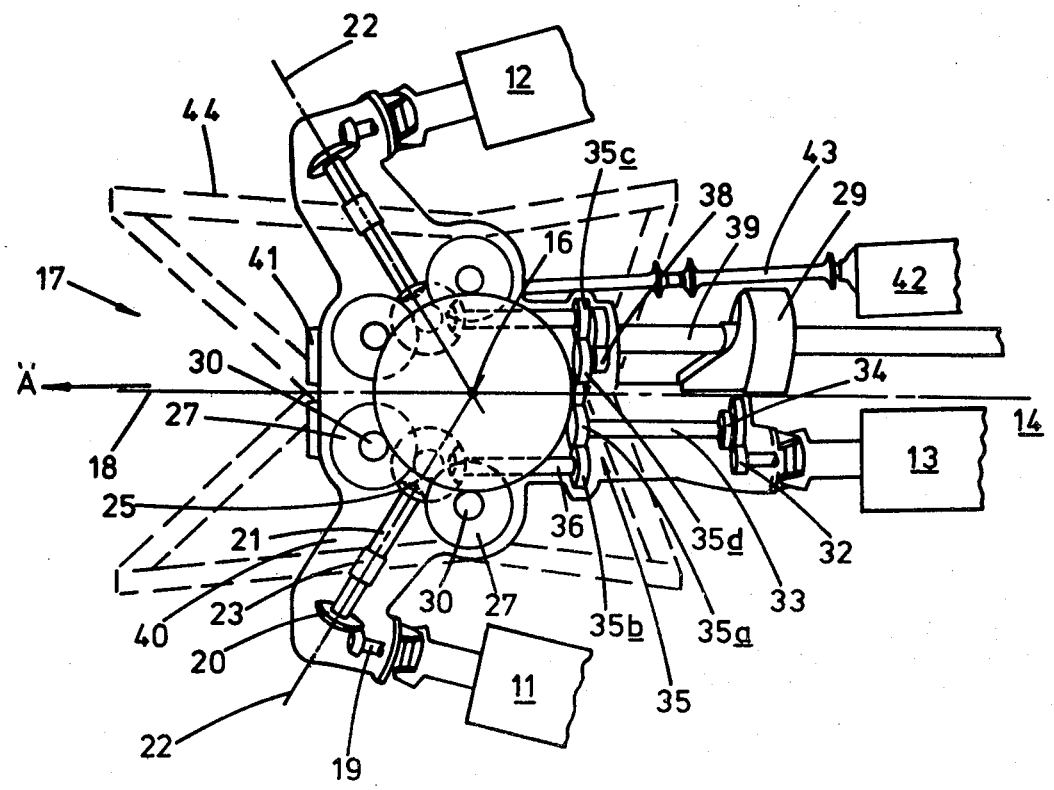

United States Patent [19]

Saunders et al.

[11] Patent Number: 4,479,619
[45] Date of Patent: Oct. 30, 1984

[54] HELICOPTER TRANSMISSION SYSTEMS
[75] Inventors: James E. Saunders; Brian A. Shotter, both of Sherborne, England
[73] Assignee: Westland plc, Yeovil, England
[21] Appl. No.: 479,992
[22] Filed: Mar. 29, 1983
[30] Foreign Application Priority Data
  Apr. 8, 1982 [GB] United Kingdom ............... 8210539
[51] Int. Cl.³ .................... B64C 27/14; B64D 35/08
[52] U.S. Cl. ................................. 244/60; 244/17.11; 416/170 R; 74/665 B; 74/665 E
[58] Field of Search ................... 244/60, 17.11, 17.23, 244/17.27, 17.21; 416/170 R, 170 B; 74/661, 642, 665 R, 665 A, 665 B, 665 C, 665 K, 665 L, 665 M, 665 P; 440/4

[56] References Cited
U.S. PATENT DOCUMENTS

| 2,823,558 | 2/1958 | Semar et al. ....................... 74/665 B |
| 2,947,497 | 8/1960 | Sznycer ............................ 416/170 B |
| 3,255,825 | 6/1966 | Mouille et al. .................... 416/170 B |
| 3,564,937 | 2/1971 | Soloviev et al. ...................... 74/661 |
| 3,602,068 | 8/1971 | White ............................... 416/170 R |
| 3,782,223 | 1/1974 | Watson ........................... 416/170 R |
| 3,977,632 | 8/1976 | Watson ................................. 244/60 |

FOREIGN PATENT DOCUMENTS 964179  7/1964  United Kingdom ................... 440/4

Primary Examiner—Galen L. Barefoot
Attorney, Agent, or Firm—Larson and Taylor

[57] ABSTRACT

A helicopter transmission system is disclosed in which drive from three engines is transmitted to two output channels each of which is divided by dividing means to drive two output pinions meshed with a common combining gear rotationally fixed to a sustaining rotor drive shaft. Balancing means are provided to balance the torque transmitted by the respective pairs of output pinions and, in the described embodiment, the balancing means comprise a plurality of meshing spur gears arranged with one of the spur gears drivingly connected to one of the engines and a further two of the spur gears are drivingly connected respectively to the two output channels. Conveniently, a further one of the spur gears provides a power take off to an anti torque rotor drive shaft.

11 Claims, 3 Drawing Figures

HELICOPTER TRANSMISSION SYSTEMS

This invention relates to helicopter transmission systems and particularly to a system for operatively connecting each of three engines to a main sustaining rotor.

According to the invention, a helicopter transmission system for operatively connecting three engines to a main sustaining rotor is characterised by torque from all three engines being transmitted to two output channels; by each output channel being divided by dividing means to drive two output pinions meshed with a common combining gear rotationally fixed to a sustaining rotor drive shaft; and by balancing means balancing the torques transmitted by the respective pairs of output pinions.

The engines may be arranged in a fan-like configuration rearwardly of an axis of rotation of the main sustaining rotor drive shaft, preferably with first and second engines spaced-apart laterally from a longitudinal centreline of the helicopter and one at each side thereof and at an acute angle to the centreline, the third engine being located between the said first and second engines and generally parallel to the centreline.

Each said output channel may comprise a gear wheel driven by all the engines and rotationally fixed to a pinion. Conveniently, each gear wheel is a bevel gear adapted to change a generally horizontal axis of rotation of driving shafts from the engines to a generally vertical axis of rotation of said pinions.

The dividing means may comprise an individual pair of gear wheels meshed with each of said pinions, and each of the four gear wheels may be connected by a shaft to drive an output pinion meshed with said common combining gear.

Preferably, the balancing means comprise a combining gear train interconnecting the drives from the three engines and consisting of a plurality of meshing spur gears. Conveniently one of said spur gears may be drivingly connected to the said third engine and a further two of said spur gears may be drivingly connected respectively to the two output channels.

In an embodiment in which each output channel includes a gear wheel driven by all the engines, the said driving connection to each output channel may comprise a drive shaft rotationally fixed to the respective spur gear of the balancing means and carrying a spiral bevel pinion gear meshed with the respective gear wheel.

A further one of said spur gears may provide a power take-off to an anti-torque rotor drive shaft.

Figure 2:
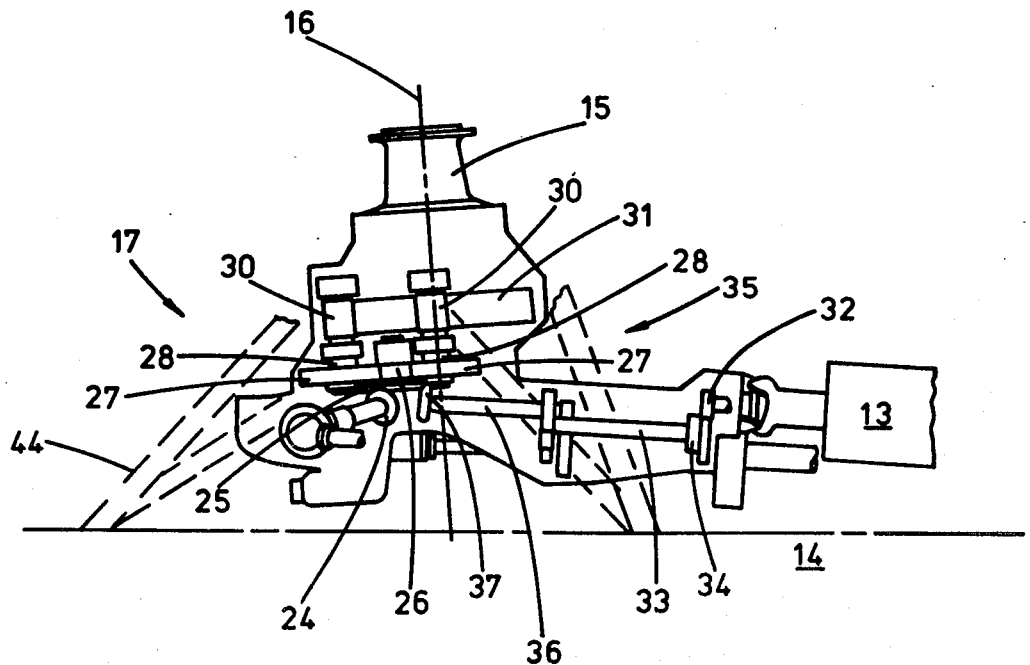
Figure 3:
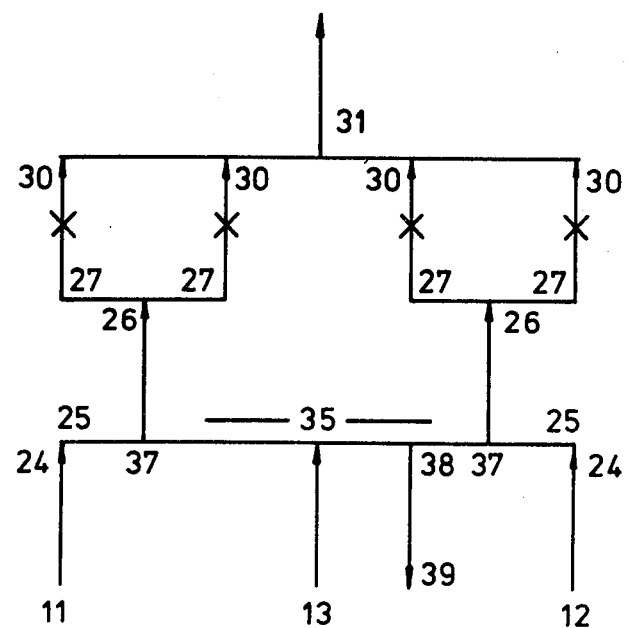

FIG. 1 is a fragmentary plan view of a transmission system constructed in accordance with the invention and installed above a helicopter fuselage, FIG. 2 is a fragmentary side elevation of the transmission system of FIG. 1, and FIG. 3 is a diagrammatic representation of the transmission system of FIGS. 1 and 2.

A helicopter has three engines 11, 12 and 13 supported above a fuselage 14 whose forward end is located in the direction of arrow A, the engines being adapted to drive a helicopter rotor drive shaft 15 (FIG. 2) about a generally vertical axis 16 through a transmission system generally indicated at 17. The transmission system is supported by a frame structure 44 attached to the roof of fuselage 14.

The three engines are located in a generally fan-like configuration in horizontal planes rearwardly of the axis 16 with first and second engines 11 and 12 supported respectively on the port and starboard sides of a fuselage longitudinal centreline 18. The engines 11 and 12 are spaced-apart laterally from the centreline and at an angle of approximately 15 degrees thereto, and the third engine 13 is located between engines 11 and 12 and generally parallel to the centreline 18.

The transmission system 17 serves to reduce the speed of rotation of the engines 11, 12 and 13 to a level suitable for rotating a main sustaining rotor (not shown) attached to the rotor drive shaft 15 and, in the illustrated embodiment, also provides the power to drive an anti-torque rotor (not shown).

Dealing firstly with the first and second engines 11 and 12 respectively, each is connected to an individual input shaft 19 to drive a pair of high speed bevel gears 20 providing a first stage speed reduction gearing. The gears 20 are connected to inwardly extending angled shafts 21 having axes 22 which, when projected, extend through the axis of rotation 16. Each of the shafts 21 incorporates a freewheel 23 and drives a spiral bevel gear pinion 24.

The pinion 24 together with its meshing gear wheel 25 provides a second stage speed reduction and changes the generally horizontal axis of rotation of shaft 21 to a generally vertical axis of rotation. The two gear wheels 25 and associated helical pinions 26 rotationally fixed to the wheels 25 provide two output channels. Each helical pinion 26 meshes with two gear wheels 27 to provide a third stage speed reduction and also a dividing means to split power from each output channel into an individual pair of load transmitting paths.

Each of the four wheels 27 drives a corresponding lay shaft 28 which transfers torque through a torsion shaft to a corresponding output pinion 30 and thence to a combining gear 31 rotationally fixed to the sustaining rotor drive shaft 15. The meshed pinions 30 and combining gear 31 provide a fourth stage speed reduction.

Referring now to the drive from the third engine 13, its location means that the direction of the axis of rotation does not have to be changed and, consequently, a spur gear set 32 of comparable ratio to the bevel gears 20 of the first and second engines is used as a first stage speed reduction.

An output shaft 33 includes a freewheel 34 and is connected to balancing means comprising a combining gear train 35 having five spur gears. One of the spur gears 35a provides the input from shaft 33 and outer gears 35b and 35c of gear train 35 drive forwardly extending shafts 36 each carrying a spiral bevel pinion gear 37 similar to pinion 24 and meshed, respectively, with the wheels 25 comprising the two output channels. In addition, a further spur gear 35d of gear train 35 provides a power take-off which drives spur gear set 38 rotationally fixed to an anti-torque rotor drive shaft 39. A rotor brake 29 is operatively associated with shaft 39.

An idler spur gear meshed with spur gears 35a and 35d completes the combining gear train 35 and ensures that the spur gears 35b and 35c rotate the respective shafts 36 and the gears 37 to drive the wheels 25 in the same direction of rotation as the drive from the gears 24 connected to the first and second engines.

In addition to its main function of transmitting power to drive a sustaining rotor and an anti-torque rotor, the transmission system of this invention is also utilised to drive an auxiliary gearbox 41 located at the front of a main gearbox housing. An auxiliary power unit 42 is provided and is connected through shafting 45 and gearing (not shown) to power the auxiliary gearbox 41 for ground running.

The transmission system of this invention is used to transmit power from three engines to drive a single main sustaining rotor and an anti-torque rotor, and features of various operating modes will now be described with particular reference to FIG. 3 in which the reference numerals used are the same as those used to identify the actual components in FIGS. 1 and 2.

Three-engined operation

Torque from all three engines 11, 12 and 13 is fed into the two output channels consisting of the gear wheels 25 and associated pinions 26. Each of the output channels is further sub-divided by the pair of wheels 27 meshed with each pinion 26 to drive the two output pinions 30, each pair of output pinions 30 meshing with the combining gear 31.

Rotational deflection of the torsion shafts indicated at X in FIG. 3 ensures a load balance between the respective pairs of output pinions 30 and, together with the combining gear train 35, a load balance between the respective sides of the transmission system.

In addition, the combining gear train 35 serves to introduce power from the third engine 13 through spur gear 35a and also transmits torque to the anti-torque tail rotor drive shaft 39 through spur gear 35d and spur gear set 38.

In one particular embodiment, the output speed of rotation of the engines is about 20,500 r.p.m., and this is reduced progressively through the four speed reducing stages to an output speed of 210 r.p.m. at the combining gear 31, and an output speed of 3307 r.p.m. at the anti-torque tail rotor drive shaft 39.

Twin-engined operation

It is envisaged that a helicopter incorporating the transmission system of this invention will, under cruise conditions when reduced power is required, operate on the first and second engines 11 and 12 only with the third engine 13 shut down.

In this condition, the third engine 13 is protected by the freewheel 34, while the torque balance is maintained by the combining spur gear train 35. The anti-torque rotor drive shaft 39 is driven by spur gear 35d, the power being taken from the bevel wheels 27 by the spiral bevel pinions 37.

Autorotation

In the event of a complete power failure, a helicopter can be controlled and landed by a procedure known in the art as autorotation in which the main sustaining rotor is driven by air flowing upwardly through the rotor disc as the helicopter descends. In this condition, the power loss drag of the three engines 11, 12 and 13 is eliminated by the two freewheels 23 and the freewheel 34 respectively. The combining spur gear train 35 is driven from the combining gear 31 thereby ensuring rotation of the anti-torque rotor drive shaft 39 to maintain control in yaw.

Stopping the Rotor System

The described transmission system is designed to accommodate the high torque loads which may result if it is necessary to stop the rotor system quickly. These high torque loads result from operation of the rotor brake 29 acting on shaft 39 at the same time that main rotory system inertia loads are transmitted from the combining gear 31.

Gear set 38 is designed to accommodate this load, and the previously described load sharing characteristics of the remainder of the transmission system ensures that braking torque up to twice the value for the maximum single engine torque case can be accommodated.

The present transmission system is designed to have a high survivability rating in the event of component failure. Operation following a complete power failure has been described under the heading "autorotation" above, and some other possible failure conditions will now be described.

Failure of third engine 13

A sudden demand for additional power resulting from a failure of the third engine 13 when the helicopter is operating in its three-engined mode will be met by operating the first and second engines 11 and 12 at increased power. As previously described, damage to the failed engine 13 will be prevented by overrunning of the freewheel 34, and the anti-torque rotor drive shaft 39 will be driven through the combining spur gear train 35. It is also to be noted that it is only the first and second stage speed reducing bevels and the combining gear train 35 which have to cater for engine emergency ratings and, since these are relatively low torque components, the resulting weight penalty is small.

Failure of one of the engines 11 or 12

In the event of a failure of one of the first or second engines 11, 12 when operating in the three-engined mode, the third engine 13 will automatically feed its power to the failure side through the combining spur gear train 35. Since the spiral bevel pinions 37 driven by the combining spur gear train 35 are identical to the spiral bevel pinions 24 from the engines 11 and 12, and since the pinions 37 mesh with the same wheel 25, the third engine 13 will operate satisfactorily in this mode. The failed one of engines 11, 12 will be protected by overrunning of the respective one of the freewheels 23.

Thus, the transmission system hereinbefore described is comprised of a simple arrangement of easily manufactured components thereby reducing weight and manufacturing costs whilst improving the reliability. The system has a high failure survivability rating and is of minimal overall height. Although it is technically feasible to achieve the described speed reduction ratio in three stages, the described four stages are preferred since a three-stage reduction, i.e. eliminating the spiral bevel gear set 20, would mean an increase in the angle of the first and second engines 11 and 12 relative the centreline 18 with a resulting increase in aerodynamic drag as well as causing engine air intake problems.

Whilst one embodiment of the invention has been desribed and illustrated it will be apparent that many modifications can be made without departing from the scope of the invention as defined in the appended claims. For example, the location of the three engines both individually and as a set can be varied to suit individual helicopter configurations and individual engine requirements. In particular the angle of engines 11 and 12 may be varied to accommodate the plan and/or elevation requirements of the engines, and engine 13 may be re-located for the same reasons and also to cater for different angle and location requirements of the anti-torque rotor drive shaft 39. The auxiliary gearbox 41 could be driven from the first stage speed reduction gearing through an actuatable freewheel to permit operation of the accessories with rotating the rotor, thereby dispensing with the auxiliary power unit 42 and the associated shafting 43.

What is claimed is:

1. A helicopter transmission system for operatively connecting three engines to a main sustaining rotor, and including two output channels connected respectively to two of the engines, dividing means dividing each output channel so as to drive two output pinions meshed with a common combining gear rotationally fixed to a sustaining rotor drive shaft, and a combining gear train providing an input for the third engine and serving to distribute power from all three engines to both output channels and to balance torque transmitted by the two output channels.

2. A transmission system as claimed in claim 1, wherein the engines are arranged in a fan-like configuration rearwardly of an axis of rotation of the main sustaining rotor drive shaft.

3. A transmission system as claimed in claim 2, wherein first and second engines are spaced-apart laterally from a longitudinal centreline of the helicopter one at each side thereof and at an acute angle to the centreline, and the third engine is located between the first and second engines and generally parallel to the centreline.

4. A transmission system as claimed in claim 1, wherein each said output channel comprises a gear wheel driven by all the engines and rotationally fixed to a pinion.

5. A transmission system as claimed in claim 4, wherein said gear wheel is a bevel gear adapted to change a generally horizontal axis of rotation of driving shafts from the engines to a generally vertical axis of rotation of said pinion.

6. A transmission system as claimed in claim 4, wherein said dividing means comprise an individual pair of gear wheels meshed with each of said pinions.

7. A transmission system as claimed in claim 1, wherein said combining gear train comprises a plurality of meshing spur gears.

8. A transmission system as claimed in claim 7, wherein one of said spur gears is drivingly connected to one of said engines and a further two of said spur gears are drivingly connected respectively to the two output channels.

9. A transmission system as claimed in claim 8, wherein a further one of said spur gears provides a power take off to an anti-torque rotor drive shaft.

10. A helicopter transmission system for operatively connecting three engines to a main sustaining rotor and comprising two output channels each including a gear wheel driven by all the engines and rotationally fixed to a pinion, dividing means comprising an individual pair of gear wheels meshed with each of said pinions and a shaft connecting each of the four gear wheels to drive an output pinion meshed with a common combining gear rotationally fixed to a sustaining rotor drive shaft, balancing means adapted to balance the torque transmitted by the respective pairs of output pinions and comprising a plurality of meshing spur gears, one of the spur gears being drivingly connected to one of the engines and each of a further two of the spur gears driving a shaft carrying a pinion gear meshed with the respective gear wheels of the said output channels.

11. A helicopter transmission system for operatively connecting three engines to a main sustaining rotor, each of first and second engines (11, 12) drivingly connected to a gear wheel (25) supported concentrically of an axis of rotation of the sustaining rotor, each gear wheel driving a pinion (26) meshed with two gear wheels (27) each driving an output pinion (30) meshed with a combining gear (31) rotationally fixed to a sustaining rotor drive shaft (15), and balancing means comprising a combining gear train (35) and shafts (36) interconnecting the respective gear wheels (25), one of the gears of the combining gear train being drivingly connected to the third engine, whereby torque from all three engines is transmitted to both of the gear wheels (25) and balanced torque is transmitted by both gear wheels (25).

* * * * *